Oct. 9, 1934.                S. N. BUCHANAN                1,976,478
                            GROUNDING FITTING
                          Filed July 17, 1929         3 Sheets-Sheet 1
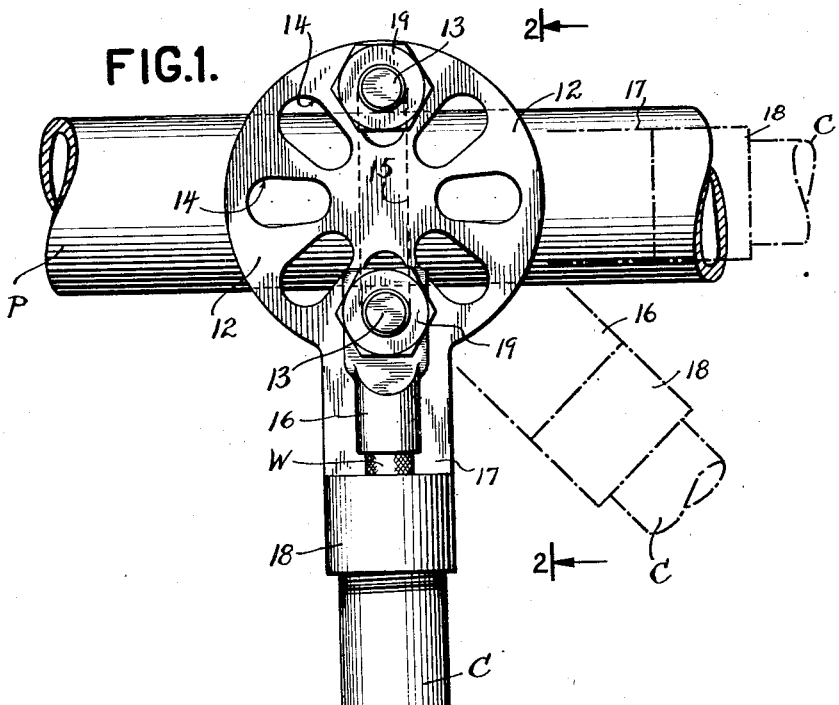
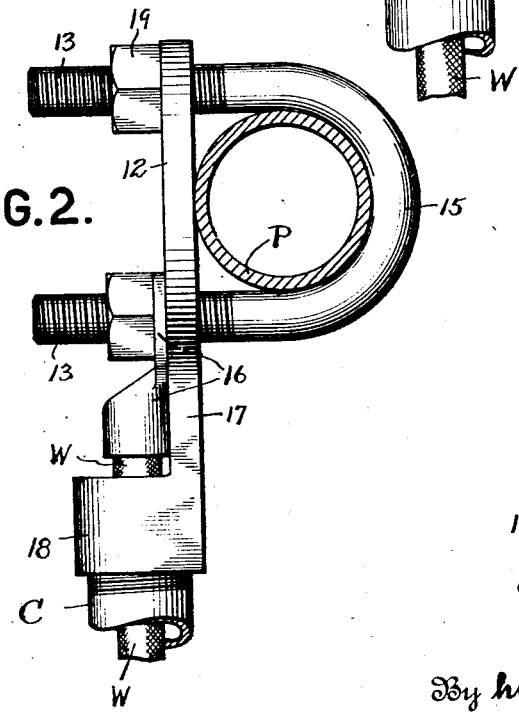
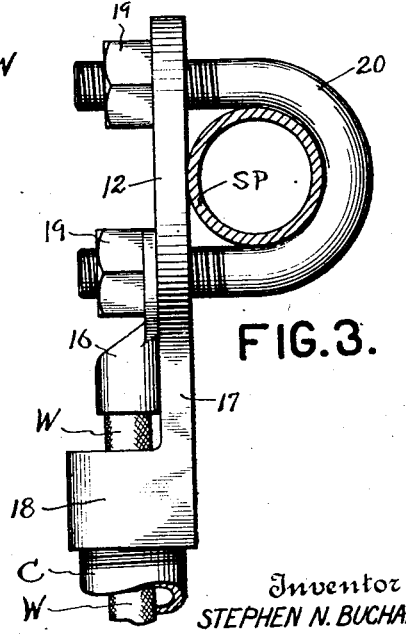
Inventor
STEPHEN N. BUCHANAN
By his Attorneys
Bohleber & Ledbetter Oct. 9, 1934.  S. N. BUCHANAN  1,976,478
GROUNDING FITTING
Filed July 17, 1929  3 Sheets-Sheet 2
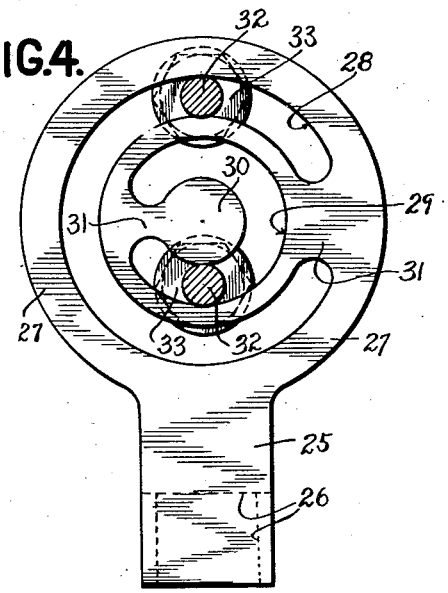
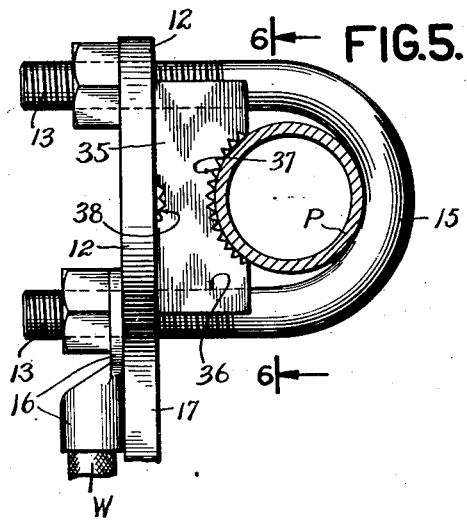
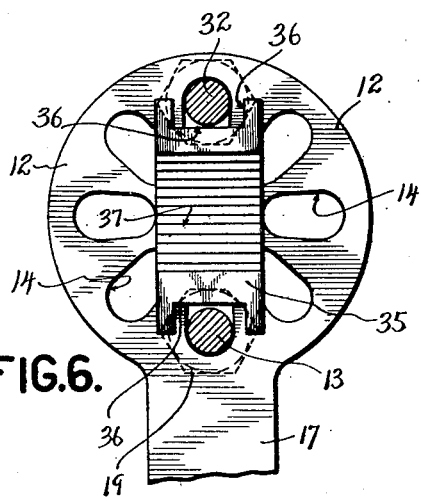
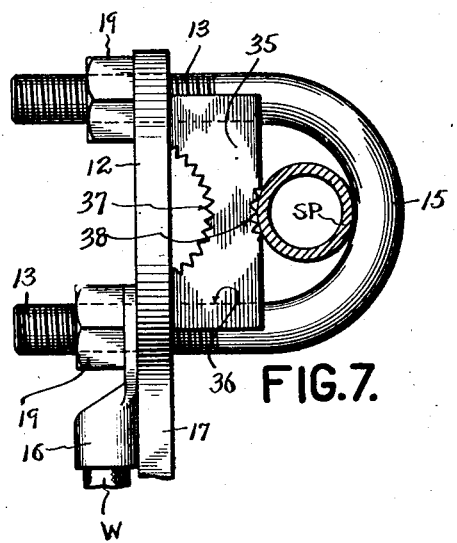
Inventor
STEPHEN N. BUCHANAN
By his Attorneys
Bobleter & Ledbetter Oct. 9, 1934. S. N. BUCHANAN 1,976,478
GROUNDING FITTING
Filed July 17, 1929 3 Sheets-Sheet 3
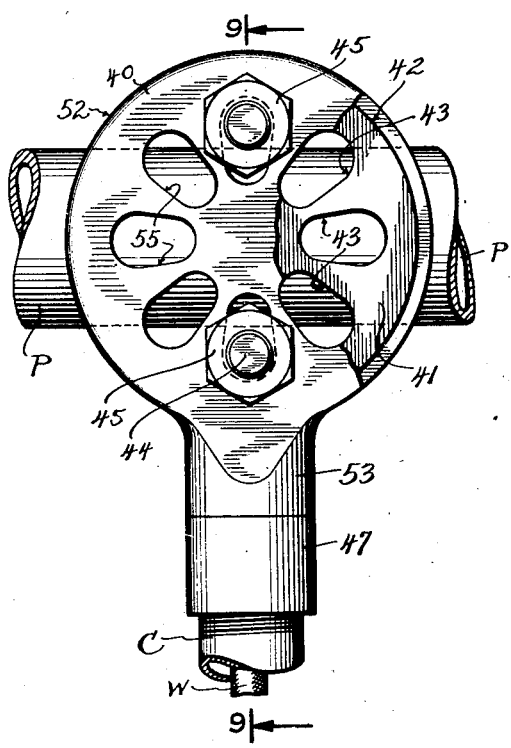
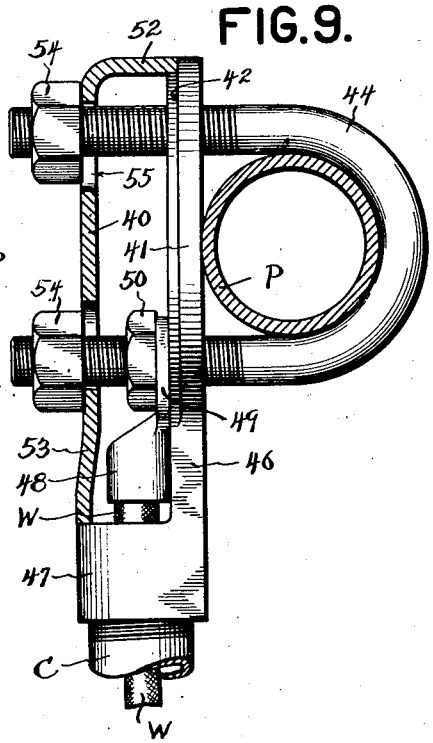
Inventor
STEPHEN N. BUCHANAN Patented Oct. 9, 1934

1,976,478

UNITED STATES PATENT OFFICE

1,976,478

GROUNDING FITTING

Stephen N. Buchanan, Elizabeth, N. J., assignor to The Thomas & Betts Co., Elizabeth, N. J., a corporation of New Jersey Application July 17, 1929, Serial No. 378,850

22 Claims. (Cl. 247—1)

This invention relates to electrical connecting devices, and more particularly to grounding fittings for establishing a ground wire connection in house and building wiring systems to render the same safe by grounding off and transmitting stray current or short circuits to the ground thru a water or gas pipe or other suitably grounded conductor.

An object of the invention is to produce an improved grounding fitting including means to establish positive electrical connection with a pipe or other similarly grounded conductor, as well as provide anchorage means by which to attach a conduit or flexible armored cable to the grounding fitting, and also to provide a suitable ground wire terminal connector on the fitting.

Further objects include that of full adjustment for the fitting on the pipe so the anchorage means for a ground wire conduit or cable may be swung around to conveniently connect with said conduit or cable; and that of covering or enclosing means for the ground wire terminal, and other objects.

With the foregoing objects and others in view, the invention has relation to certain combinations and arrangements of parts, concrete embodiments or examples of which are disclosed in the accompanying drawings wherein:

Figures 1, 2 and 3 illustrate a first form of construction serving to illustrate the principles of the invention.

Figure 1 shows a plan view of one form of the grounding fitting attached to a water pipe or other pipe which leads to the ground, and hence the pipe is used to transmit short circuits or stray current from a wiring system to the ground; and the adjustable feature is shown in dotted lines to illustrate how the fitting is pointed in any desired direction to connect it with a ground wire conduit or other ground wire protective covering.

Figure 2 shows a side view of Figure 1 or a cross-section thereof, as taken on the line 2—2.

Figure 3 shows a side view similar to Figure 2, but illustrating the grounding device mounting a smaller size pipe clamp yoke thereby adapting the fitting to a smaller size water gas or other pipe.

Figure 4 shows a plan view of a modified second form of the grounding fitting removed from the pipe to which it is adapted to be connected and showing the clamping yoke in section. This form of fitting provides an extended or continuous rotary adjustment by which any desirable angle can be attained for attaching the fitting to a ground wire protective covering such as a conduit or flexible armored cable, irrespective of the direction in which the latter may approach the fitting.

Figures 5, 6 and 7 show a modified third form of the invention wherein a grooved and toothed pipe seat or saddle is provided to establish positive electrical contact with different size pipes to which the fitting is clamped.

Figure 5 shows a side view of the third form of the invention with the larger saddle groove in use on large pipe; Figure 6 a section as taken on the line 6—6 of Figure 5 and the pipe is removed; and Figure 7 shows a reversed position for the pipe seat saddle adapting it to a smaller water or grounding pipe.

Figures 8, 9 and 10 show a cover on the fitting to enclose the electrical terminal on the end of a ground wire, the cover being held in place by the same clamp yoke which establishes the ground wire and pipe connection.

Figure 8 shows a plan view of the cover attached to the grounding fitting with a portion of the cover broken away to show the grounding fitting disk thereunder.

Figure 9 shows a side view or a section taken on line 9—9 of Figure 8.

Figure 10 shows a perspective view of the cover removed from the grounding device and shows a neck on the cover which fits over a neck on the fitting to form a housing thru which a ground wire is led to the fitting.

Referring now more particularly to the drawings for a further description of the invention, there is shown throughout the several views ordinary water or gas pipes P or SP of various sizes and usually available in houses, buildings and the like and to which it is desired to connect a ground wire to carry off short circuit currents and the like for safety. This invention provides a positive grounding fitting adapted to establish electrical contact with a pipe of any size and by which an ordinary ground wire terminal or soldering lug is electrically connected thereto.

A pipe clamp is provided in various forms and sizes and meets all conditions and requirements as will be shown. One form of pipe clamp includes a pipe seat in any suitable disk or plate form or shape, being rectangular, square or otherwise, as shown at 12, 27 and 41, and fitted with a yoke 13, 15, 20 or 44. Nuts or other operating means 19 or 45 draw the pipe clamp parts (yoke and seat) about the pipe. On this pipe clamp is carried a suitable ground wire connector. But more and significant features of construction and use characterize this invention and are combined with the simple pipe clamp as will be shown.

A pipe seat member or pipe engaging means 12 is adapted to engage the pipe and be clamped thereagainst by a yoke 13 or other suitable means which embraces a pipe P to positively grip the seat member 12 in electrical engagement with the pipe. The seat 12 is made with one or more openings 14 spaced apart and between which the pipe P is disposed. In other words, the apertures or holes 14 formed in the pipe seat 12 are spaced apart sufficiently to receive a pipe therebetween which means that the clamp seat, body or strap 12 has a sufficient spread of reach to extend it beyond the pipe sides. The pipe seat 12 is made with a sufficient spread, say breadth and/or length, as stated, to receive the pipe P or SP between the perforations so that the legs 13 of the clamp yoke will reach alongside the pipe to draw the arch 15 of the clamped yoke tightly about and against the pipe.

In some forms of the invention, the member 12 is made in the form of a disk or plate and a plurality of clamp receiving holes 14 are formed about the periphery thereof so that the disk may be adjusted by rotating it upon the pipe P and then placing the clamp legs thru such appropriate openings 14 as required to mount the fitting in the position desired to line up the fitting with a ground wire conduit or armored cable C. The pipe seat disk 12 carries an arm or neck 17 on the outer end of which is formed anchorage means 18 to receive and hold the end of a ground wire protective covering C. The example of conduit or cable anchorage means 18 shown simply comprises an internally threaded sleeve or nipple into which is screw threaded the conduit C covering the usual ground wire W.

In building construction it is understood how the conduit C may approach the water pipe P at any angle and thus it is desirable to provide the adjustment means as exemplified in the several spaced holes 14 so that the neck 17 may be adjustably swung to any desired angle with the pipe P so as to conveniently connect with the ground wire conduit C. Figure 1 shows the conduit C approaching the water pipe P at right angles thereto, but the dotted line construction shows the conduit C approaching it at about a forty-five degree angle. Thus the drawings illustrate the many different adjustments to which the grounding fitting is susceptible in order to render it convenient to connect the water pipe P and electrical conduit C irrespective of their positions. The reference C merely designates the conduit or a spiral cable in which it is usual to install the ground wire W but this protective covering C may be omitted and the wire W is just as readily grounded to the fitting 12 by reason of the usual terminal or soldering lug 16 on the end of the ground wire which lug is clamped under the nut 19 or electrically connected to any suitable connecter means on the fitting.

Figures 1 and 2 show what might be called a large sized yoke 13—15 to ground the wire W on a large pipe P and it is readily seen how a smaller size yoke, the legs of which are closer together, may be mounted in the pipe seat member 12 by reason of the elongated holes 14 to adapt the device to a smaller pipe SP as shown in Figure 3. The reference 20 indicates a smaller size yoke mounted on the same pipe seat 12. A ground wire W is carried through the conduit C and is attached to an electrical terminal or soldering lug 16 which is connected to one end of the wire and the terminal 16 is clamped under one of the nuts 19 to tighten the clamp yoke 15 in final position about the pipe and thereby electrically connect the wire W to said pipe.

Reference is now made to Figure 4 showing a modified second form of the invention and that grounding fitting is capable of continuous rotary adjustment upon the pipe so as to attain for its neck 25 and conduit anchorage 26 any number of positions in angular relation to a pipe P. The neck 25 carries the conduit or cable anchorage 26 in the form of a threaded sleeve or any other suitable means. A disk pipe seat 27 is integrally formed on the neck and includes an opening 28 describing substantially as a circle or nearly so about the center of the pipe seat 27. An inner opening 29 is made in the disk 27 and describes a similar arc or circle on a shorter radius than that of the radius of the opening 28. The openings 28 and 29 are concentric circular band openings and each opening 28 and 29 is a circular opening means. The radial or segmental inside opening 29 leaves a solid center 30 in the disk. A neck 31 serves to hold the center structure of the disk in place, thus affording two concentric openings 28 and 29 adapted as spaced openings to receive a pipe clamp yoke 32 to embrace a pipe and positively anchor the pipe in electrical contact with the disk 27. A nut 33 screw threads onto each clamp yoke 32 to tighten it against the water or other ground pipe to which the ground wire is connected through the disk pipe seat 27.

Still referring to Figure 4, it is noted that the legs 32 of the pipe clamp are disposed through the circular openings 28 and 29. Hence the yoke 32 may remain stationary on the water pipe P and the pipe seat 27 may be rotatably adjusted thereabout in relation to the water pipe and the clamp 32. This device affords any number of positions for the grounding fitting neck 25 in relation to the water pipe P to which it is connected, and hence the neck 25 and conduit receiving sleeve 26 may be pointed in any direction or angular relation in respect to a water pipe to which it is connected. In this way it matters not in which direction the pipe P and conduit C extend because the rotary adjustment attained by the clamp legs in the concentric openings 28 and 29 meet all conditions.

The pair of concentric circular openings 28 and 29 are provided so that two and, if necessary, three sizes of clamping yokes may be used for three sizes of grounded conductors or water pipes. Commercial practice usually contemplates grounding fittings for two sizes of pipe since both sizes of pipe are used as water inlets into houses and buildings. The electrician takes advantage of the good electric grounding connection afforded by the water pipes. In the form of radial slot 14 shown in Figure 1, two or more sizes of yokes may be received in the slot and this feature has been incorporated in the structure of Figure 4. A large size yoke for large size pipe will have its legs projecting through the large circular opening 28, and Figure 5 shows such a large size yoke adapted to be received in the large circular opening 28 or adapted to be received in the form with radial slots 14 shown in Figure 6. The medium size yoke 32 is shown in Figure 4 with a leg 32 projecting through each concentric circular opening 28 and 29. Figure 3 shows this same size yoke 20 used in the form of pipe seat member 12 having radial slots 14. The small size circular opening may be used for a small size yoke, although two yokes are all that is necessary for commercial practice.

In the construction of Figure 3, therefore, at least one opening 28 is provided to receive the legs of a yoke, which yoke is angularly adjustable with respect to the pipe seat member 12. Two openings may be provided as in the two concentric circular openings 28 and 29 in Figure 4, or two radial openings 14 as in Figure 5.

Two forms of openings, namely the openings 14 in Figure 1 and the opening 28 or 29 in Figure 4 as well as these two openings taken together, illustrate opening means extending through the member by which angular adjustment may be obtained between the yoke 13 or 32 and its cooperating member 12 or 27. The primary purpose of the angular adjustment between the yoke and the member is to permit angular adjustment of the anchorage means 26 relatively to the water pipe P. The opening means also have different diameters which permit U-shaped clamping yokes of different sizes to be inserted therethrough, for instance, the elongated opening 14 of Figure 1 has an outer diameter to receive the yoke shown in Figure 2 and an inner diameter, formed by the inner end of the elongated opening, to receive the smaller yoke shown in Figure 3.

Similarly, the opening 28 through the member 27 of Figure 4 is of one diameter to receive a large size yoke 15, shown in Figure 5, and the inner opening 29 is of a smaller diameter to receive a smaller yoke, or both openings may be used to permit the use of the yoke 32 of intermediate size shown in Figure 4.

Coming now to Figures 5, 6 and 7, showing a modified third form of the invention, there is illustrated the same pipe seat or clamp strap 12 made in the form of a disk if desirable, as heretofore described, and having a number of elongated clamp receiving holes 14 formed about the periphery thereof. The neck 17 and anchorage means for a conduit C or other ground wire protective covering are broken away since the parts are clearly shown in Figures 1, 2 and 3.

In this form of the invention (Figures 5, 6 and 7), the improvement consists essentially of a reversible grooved and toothed pipe seat in the form of a saddle 35 carried by the pipe clamp as on the pipe seat or leg strap 12. The saddle 35 and the pipe seat 12 together form pipe engaging means. This saddle 35 is slotted at its ends as indicated by the reference 36 so as to easily straddle or receive the clamp yoke 13 which is tightened on the pipe by nuts 19 heretofore described. The slots 36 guide and retain the saddle in position in the pipe clamp. The pipe seat saddle 35 is made with a large toothed groove 37 and with a small toothed groove 38. Either one of the toothed grooves 37 or 38 may be used, depending upon the size of the water pipe P with which the grounding fitting is adapted to be connected.

Figure 5 shows the large toothed groove pipe seat 37 applied to a large size water pipe P which disposes the smaller toothed pipe seat groove 38 toward the strap or disk member 12. On the other hand, Figure 7 shows the saddle 37 reversed and adapted to engage and make electrical connection with a small size water pipe SP. The larger yoke 13—15 heretofore described is therefore well adapted to both sizes of water pipes P and SP because of the two sizes of the grooved toothed pipe seats provided in the adjustable and reversible saddle 37. By loosening the nuts 19 on the yoke, the saddle 35 can be placed in either position desired, with either pipe seat 37 or 38 turned toward the cylindrical surface of the water pipe. The soldering lug 16 and its ground wire W may be electrically connected under one of the nuts 19 as heretofore described. Upon tightening the nuts 19, the grooved toothed seat 37 or 38 burrs into the pipe surface breaking through the scale thereon and establishing good electrical connection so that the ground wire W is positively connected to water pipe P of any size. The toothed saddle 35 may have any number of grooved pipe seats therein as by forming the same on all the surfaces of said saddle.

Referring to Figures 8, 9 and 10, there is shown a grounding fitting device similar to that shown in Figures 1, 2 and 3 except that a cover 40 may be applied to the fitting to cover the electrical connection afforded by a soldering lug 48, wire W, nut 50 and the like. In this form of the invention, there is shown a disk type pipe seat 41 having a shoulder 42 to receive the cover 40. The pipe seat 41 is made with a plurality of clamp receiving holes 43 about its periphery to receive a water pipe clamp yoke 44 drawn tightly into anchored electrical connection by nuts 54 gripping the seat 41 against the pipe. The holes 43 may be elongated towards the center as heretofore described for the first form of the invention so as to adapt the grounding fitting to a large or small size pipe yoke in keeping with the size of a water pipe on which the grounding fitting is to be installed. For example the smaller pipe yoke 20 in Figure 3 may be used with the cover 40 and pipe seat 41 if desired. Furthermore the saddle 35 may be used with the covered fitting. Many combinations are possible and hence all cannot be shown.

The pipe seat 41 is made with a neck 46 carrying a threaded pipe receiving nipple or sleeve 47 to which a rigid conduit C or a flexible spiral metal armored cable is connected and in which the grounding wire W is housed. A soldering lug 48 is electrically connected to the wire W and has its eye 49 mounted on one leg 44 of the clamp lug. A clamp nut 50 tightens the soldering lug eye 49 against the pipe seat to make electrical connection. The cover 40 heretofore mentioned is made with a flange 52, and a neck 53 is also formed on the cover 40 in conjunction with the flange 52. The cover neck 53 fits the contour of and abuts against the end of the sleeve 47 and with the stem or neck 46, all together makes a closure or protective covering for the wire W where it leads from the conduit C. The ground wire and its terminal 48 are therefore concealed.

The cover 40 is placed over the pipe seat disk 41 and nuts 54 are tightened up on the outer ends of the yoke legs 44 to draw the pipe P into electrical engagement with the pipe seat 41 and to secure the cover 40 in place. The cover 40 is made with a plurality of spaced openings 55 to conform or register with the openings 43 in the pipe seat so that the cover 40 and pipe seat 41 may be adjustably rotated on the pipe P and about the clamp yoke 44 so as to conveniently connect the conduit C to the grounding fitting irrespective of the angular position of the pipe P and conduit C. The flange 52 fits into the shoulder 42 to make a snug fit between the parts.

The cover 40 and pipe seat or clamp strap 41 fit together to make a closed grounding fitting. Different size yokes may be used to adapt the device to different size pipes because of the arrangement of registering yoke holes in the parts. Only three nuts 50, 54 and 54 are required to anchor all parts together. Many different combinations may be attained both for pipe sizes and directions as respects the two pipes P and C.

This device fills a long felt need in that it supplies various forms of construction to positively connect a ground wire W to a water or other pipe P usually available in a building and such a ground wire installation renders the entire electrical wiring system safe.

What is claimed is:—

1. In a grounding fitting, a member seated against a water pipe or the like, said member having an opening adjacent which the pipe is placed, a clamping member carried in the opening and engaging the pipe, operating means on the clamping member to draw the latter tightly against the pipe and hence the pipe against the member to make electrical connection, anchorage means carried by the member to which a ground wire protective covering may be connected, an electrical terminal for a ground wire engaged by the operating means, and a cover cap disposed over the electrical terminal and engaged by the operating means to secure the cap in place on the member.

2. In a grounding fitting, a member adapted to rest against a water pipe or the like, said member having a narrow band opening in circular form through the member and adjacent which the pipe is placed a U-shaped clamp having both legs passing through the opening and engaging the pipe, the circular opening permitting angular adjustment between the member and the U-shaped clamp, anchorage means carried by the member to connect with a grounding wire protective covering, and operating means upon both legs of the U-shaped clamping member to tighten the clamp about the pipe and grip the latter against the member.

3. In a grounding fitting, a pipe seat adapted to engage a pipe, said pipe seat being provided with pairs of openings in which each pair is angularly spaced apart and between which the pipe is placed, a U-shaped clamping yoke having its ends mounted in one of the pairs of openings, nuts on the yoke ends to draw the yoke against the pipe and the latter against the pipe seat, at least one of said openings being elongated in form toward the other opening to receive small size pipe therebetween and to receive a small size yoke therein.

4. In a grounding fitting for use on pipes and the like, a member provided with spaced openings between which said pipe is disposed, contacting means on the member against which the pipe rests including a plurality of grooves adapted as pipe seats, each groove being formed on a different radius to accommodate different size pipes, and clamping means engaging an opening and reaching over the pipe to grip the latter against the seat.

5. In a grounding fitting for use on pipes and the like, a member provided with a plurality of pairs of spaced openings angularly positioned relatively to each other between which said pipe is disposed, contacting means on the member having a groove in which the pipe rests, clamping means slidably carried in the openings and reaching over the pipe to force together the member and the contacting means and pipe, and means carried with the member to which may be connected a grounding wire protective covering.

6. In a grounding fitting for use on pipes and the like, a member having a plurality of pairs of spaced openings angularly disposed relatively to each other between which said pipe is disposed, contacting means on the member having a plurality of grooves in which the pipe rests, clamping means slidably carried in the openings and reaching over the pipe to force together the member and pipe, and anchorage means carried by the member to which may be attached a conduit or the like.

7. In a grounding fitting for use on pipes and the like, a member having a plurality of pairs of spaced openings between which said pipe is disposed, at least one of the openings being elongated towards the other opening, contacting means on the member having a plurality of grooves in which the pipe rests, clamping means slidably carried in the openings and reaching over the pipe to force together the member and pipe, and anchorage means carried by the member proximate one of the openings.

8. In a grounding fitting, a disk pipe seat having a plurality of spaced openings therethrough angularly positioned relatively to each other, a U-shaped clamp yoke slidable in the openings and reaching over the pipe, and a nut on the yoke to tighten the latter to grip the pipe against the seat.

9. In a grounding fitting, a disk pipe seat having a plurality of spaced openings therethrough angularly positioned relatively to each other, a neck integral with the disk pipe seat and projecting therefrom, means carried by the neck to which may be attached a ground wire protective covering, a U-shaped clamp yoke slidable in the openings and reaching over the pipe, and a nut on the yoke to grip the pipe against the seat.

10. In a grounding fitting, a pipe seat provided with openings in its periphery, said openings being elongated toward the center of the pipe seat to receive one of a plurality of sizes of yokes for different sizes of pipes, a suitable size clamp yoke adapted to arch over a pipe and anchor the latter to the seat and having threaded legs which pass through the elongated openings, and a nut on the threaded legs to draw the clamp and seat against the pipe.

11. In a grounding fitting, a pipe seat, a ground wire terminal connector, a pipe clamp cooperating therewith, pipe seat groove means associated with the seat and clamp to burr into the pipe surface to make positive contact, and said means including a plurality of toothed grooves of different diameters to accommodate the fitting to different size pipes.

12. In a grounding fitting, a pipe seat, a ground wire terminal connector, a pipe clamp cooperating therewith, toothed pipe seat groove means associated with the seat and clamp to burr into the pipe surface to make positive contact, said means including a plurality of toothed grooves of different size diameter to accommodate the fitting to different size pipes, and the means being loosely mounted on the fitting and held in place by the clamp, said different size toothed grooves being carried on different portions of the means, and said means being reversible on the fitting to bring into service the desired toothed groove.

13. In a grounding fitting, a pipe clamp to embrace a pipe and including a threaded yoke and strap and nuts to draw these parts about the pipe, a ground wire electrical connector means on the fitting, a pipe seat saddle resting on the strap and loosely adjustable and reversible in the yoke, and said seat being provided with toothed grooves of different pipe sizes to burr into the pipe surface for good contact.

14. In a grounding fitting, a pipe clamp to embrace a pipe and including a threaded yoke and strap and nuts to draw these parts about the pipe, a ground wire electrical connector means on the fitting, a pipe seat saddle comprising a member having guide means in its ends, said guide means serving to retain the member in the yoke and strap and rendering the member reversible in the pipe clamp, and said seat being provided with a plurality of grooved seats of different sizes.

15. In a grounding fitting, a pipe clamp including a strap and yoke with nuts to tighten the clamp on a pipe, a ground wire terminal connector on the fitting, a cover placed on the fitting over the wire terminal, said cover having means to receive the yoke whereby the yoke and nuts clamp the cover in place on the fitting.

16. In a grounding fitting, a pipe seat adapted to engage a pipe, said pipe seat being provided with a plurality of pairs of openings in which each pair is spaced apart and between which the pipe is placed, each pair of openings being angularly disposed with respect to the other pairs, a clamping yoke having its ends mounted in a pair of openings, nuts on the yoke ends to draw the yoke against the pipe and the latter against the pipe seat, at least one of said pairs of spaced openings being elongated in form toward and away from the other opening and adapted to receive pipe of a different size therebetween and to receive a yoke of different size therein, and a cover cap surrounding at least one leg of the yoke and secured in position thereby.

17. A grounding fitting comprising a member, a U-shaped clamping yoke, opening means through the member through which the ends of the U-shaped clamping yoke project, the opening means permitting angular adjustability of the member relatively to the U-shaped clamping yoke in a plane perpendicular to said yoke, operating means upon the ends of the U-shaped clamping yoke to draw the yoke against a pipe passing therethrough and clamp the latter against the member, anchorage means carried by the member to which a ground wire protective covering may be connected, and a cover cap surrounding at least one leg of the U-shaped clamping yoke and secured in position thereby.

18. A grounding fitting comprising a member, a U-shaped clamping yoke, opening means through the member through which the ends of the U-shaped clamping yoke project, the opening means permitting angular adjustability of the member relatively to the U-shaped clamping yoke in a plane perpendicular to said yoke, the opening means having diameters permitting U-shaped clamping yokes of different sizes to be inserted therethrough, operating means upon the ends of the U-shaped clamping yoke to draw the yoke against a pipe passing therethrough and clamp the latter against the member, and anchorage means carried by the member to which a ground wire protective covering may be connected.

19. A grounding fitting comprising a member, a U-shaped clamping yoke, opening means through the member through which the ends of the U-shaped clamping yoke project, the opening means permitting angular adjustability of the member relatively to the U-shaped clamping yoke in a plane perpendicular to said yoke, the opening means having diameters permitting U-shaped clamping yokes of different sizes to be inserted therethrough, operating means upon the ends of the U-shaped clamping yoke to draw the yoke against a pipe passing therethrough and clamp the latter against the member, anchorage means carried by the member to which a ground wire protective covering may be connected, and a cover cap surrounding at least one leg of the U-shaped clamping yoke and secured in position thereby.

20. A grounding fitting comprising a member, a U-shaped clamping yoke, two concentric circular openings through the member at least one of which is a band opening in circular form, the ends of the U-shaped clamping yoke projecting through at least one of the openings and having angular adjustability therein relatively to the member, the two circular openings permitting U-shaped clamping yokes of different sizes to be used with each member, operating means upon the ends of the U-shaped clamping yoke to draw the yoke against a pipe passing therethrough and clamp the latter against the member, and anchorage means carried by the member to which a ground wire protective covering may be connected.

21. A grounding fitting comprising a member, a U-shaped clamping yoke, at least two concentric band openings in circular form through the member through at least one of which the ends of the U-shaped clamping yoke project and having angular adjustability relatively to the member, the two concentric openings permitting U-shaped clamping yokes of different sizes to be used with each member, operating means upon the ends of the U-shaped clamping yoke to draw the yoke against a pipe passing therethrough and clamp the latter against the member, and anchorage means carried by the member to which a ground wire protective covering may be connected.

22. In a grounding fitting, a pipe engaging means adapted to rest against a water pipe or the like, said pipe engaging means having an opening means in circular form through the pipe engaging means and adjacent which the pipe is placed, a U-shaped clamp having both legs passing through the circular opening means and engaging the pipe, the circular opening means permitting angular adjustment between the pipe engaging means and the U-shaped clamp in a plane perpendicular to the U-shaped clamp, anchorage means carried by the pipe engaging means to connect with a grounding wire protective covering, and operating means upon both legs of the U-shaped clamp to tighten the clamp about the pipe and grip the latter against the pipe engaging means.

STEPHEN N. BUCHANAN.